Figure 1:
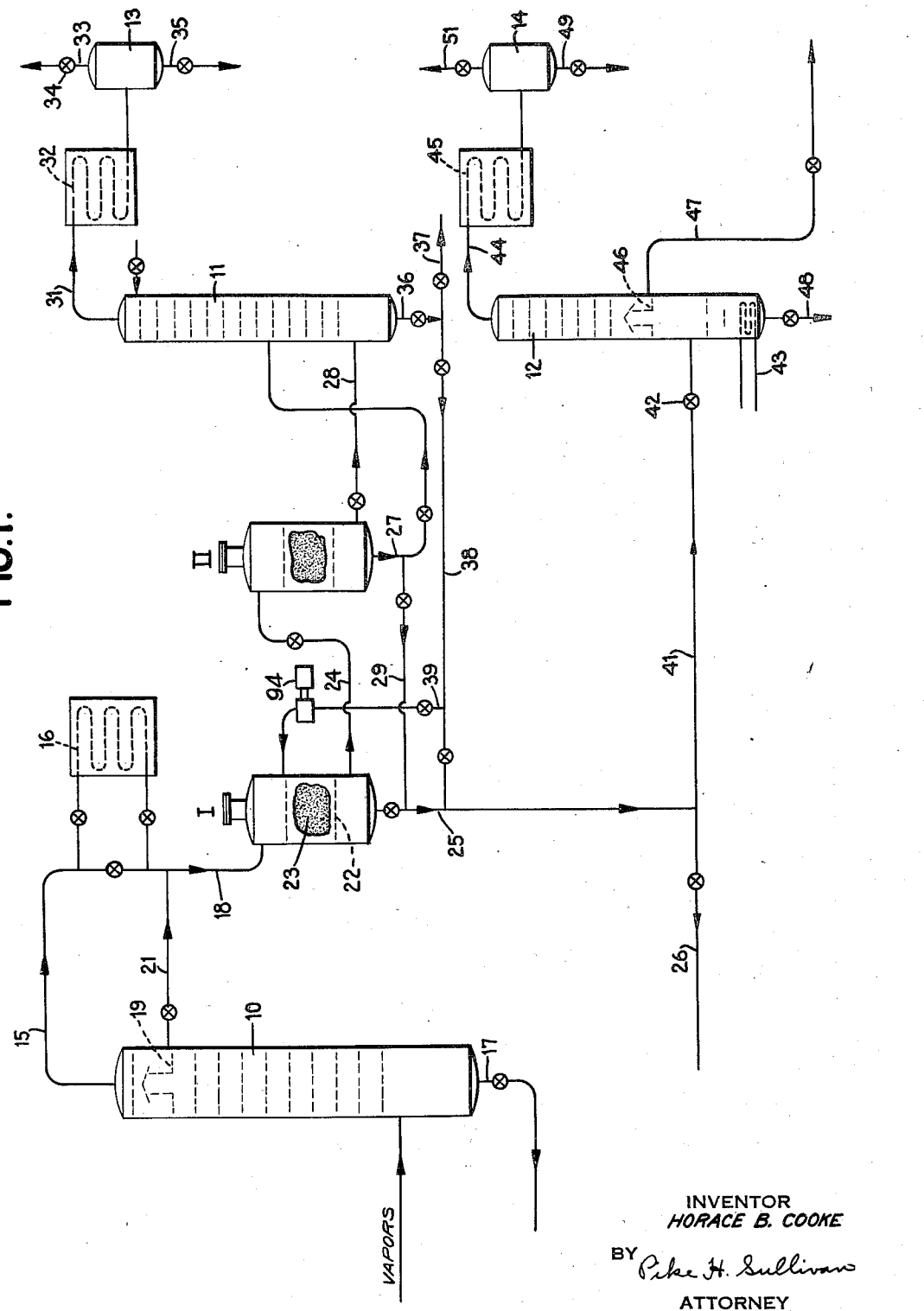

Jan. 23, 1940.     H. B. COOKE     2,188,075
TREATMENT OF HYDROCARBON DISTILLATES
Filed Feb. 18, 1936     2 Sheets-Sheet 1

INVENTOR
*HORACE B. COOKE*
BY *Pike H. Sullivan*
ATTORNEY

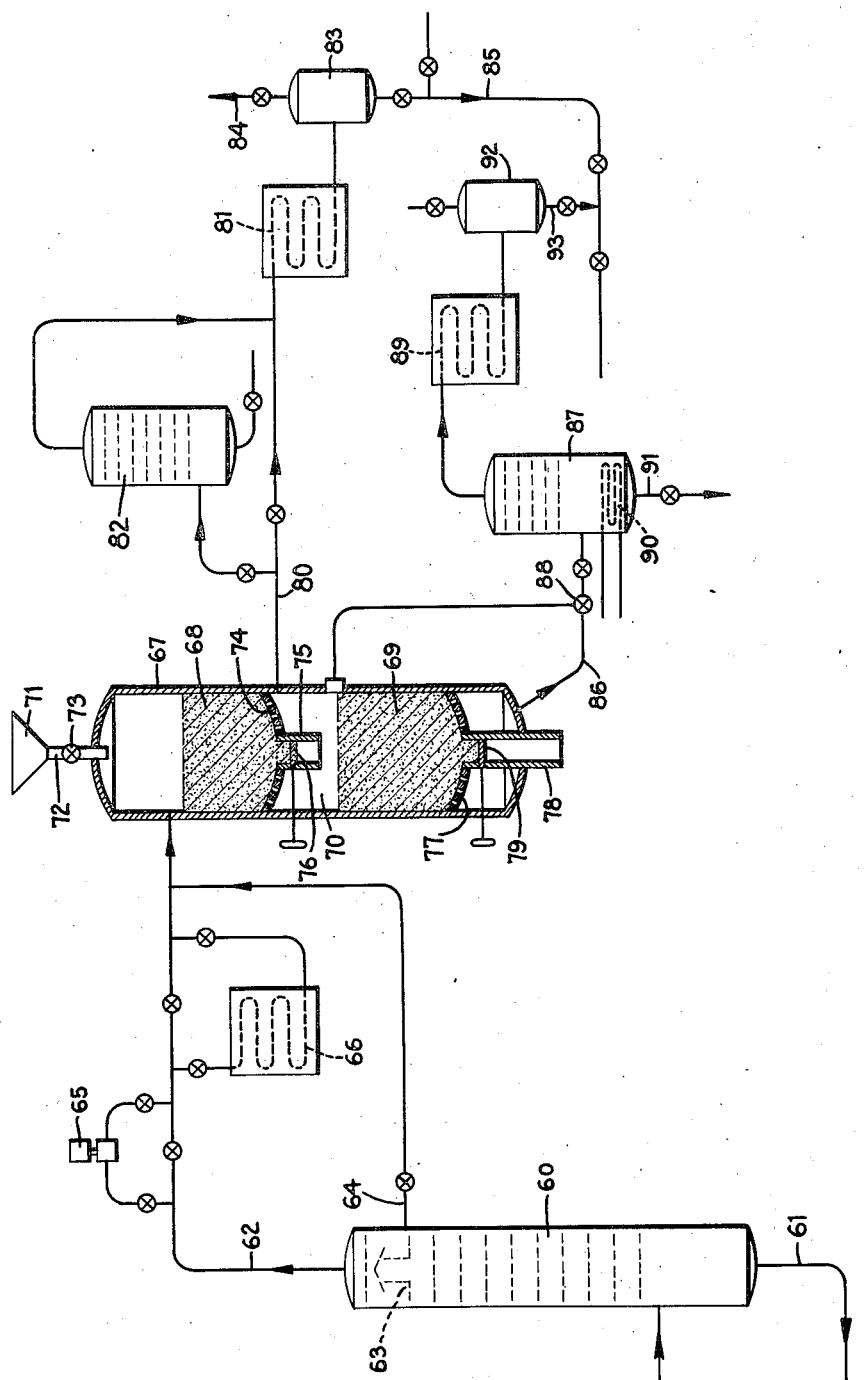

Patented Jan. 23, 1940

2,188,075

UNITED STATES PATENT OFFICE 2,188,075

TREATMENT OF HYDROCARBON DISTILLATES

Horace B. Cooke, Greenwich, Conn., assignor to The Gray Processes Corporation, Newark, N. J., a corporation of Delaware Application February 18, 1936, Serial No. 64,430

6 Claims. (Cl. 196—94)

This invention relates to the treatment of hydrocarbon products to remove objectionable unsaturates therefrom so as to improve the stability of the product with respect to the formation of undesirable color-imparting and gum-forming compounds. More particularly, my invention pertains to a method of treating hydrocarbons containing two or more component parts which require different degrees of treatment of the nature above mentioned, and wherein one of the component parts is subjected to treatment in liquid phase, whereas the other component part is treated in vapor phase.

One of the objects of my invention is to produce a simple and efficient method of effecting such treatment which will require a small amount of operating equipment and which will reduce the initial installation cost and subsequent maintenance expense. My invention has for further objects such operative improvements and advantages as may hereinafter be found to obtain.

In accordance with my invention, a combined stream of hydrocarbons, containing one component in liquid phase and another component in vapor phase is passed through a bed of solid adsorbent material to improve the color and stability of the material being treated. The liquid and vapor components are then separated from each other and one or both components separately treated by additional adsorbent material. When operating in accordance with my invention, the liquid component of the original charging stock is not only subjected to the desired adsorbent treatment but serves as a solvent medium for removing polymers formed during the treatment.

As one example of my invention, a combined stream of vapors from a cracking operation, or cracked products from a re-running operation, containing gasoline and furnace oil constituents, is subjected to partial condensation to liquefy the furnace oil constituents, and the mixture of liquid furnace oil and gasoline vapor is initially treated by passing the same through a bed of adsorbent material, such as clay, to improve the color and stability of the liquid furnace oil to the desired extent, after which the gasoline and furnace oil are separated and the gasoline constituents subjected to more complete treatment with adsorbent material for further improving the color and stability thereof. The furnace oil component may be separately collected as a final product with or without removal therefrom of polymers formed in the initial clay-treating bed.

According to another mode of operating my process, a stream of cracked vapors consisting principally of constituents boiling below the end point of gasoline is subjected to partial condensation by increase in pressure or by reduction in temperature, or both, to condense higher-boiling gasoline constituents, the mixed vapor and liquid initially treated with adsorbent material to improve the vapor fraction to the desired extent, after which the vapor and liquid fractions are separated and the liquid fraction subjected to further treatment with adsorbent material in liquid phase. This mode of operation is of particular advantage when treating cracked gasoline resulting from high temperature, low pressure cracking operations, in which case it is often undesirable to subject the lower-boiling gasoline constituents to treatment to the extent required for stabilizing the higher-boiling constituents.

When operating in this manner the two beds of adsorbent material may be positioned in one tower in vertically spaced relation and arranged so that spent or degraded clay may be discharged from the bottom of the tower and replenished by partly degraded clay from the uppermost bed which is in turn replenished with fresh material.

With the above objects and advantages in view, my invention will be best understood by reference to the accompanying drawings forming a part of this description and wherein Figure 1 is a schematic illustration showing one type of apparatus suitable for carrying my invention into effect, and Figure 2 is an illustration of an apparatus for carrying out another modification of my process having parts shown in section.

The apparatus shown in Figure I may comprise a fractionating tower 10, clay towers I and II, an after-fractionator 11, a combined distilling and fractionating tower 12, receiving drums 13 and 14, together with suitable pipe lines, pumps, valves, condensers and other appurtenant equipment for carrying out the process hereinafter described.

Hydrocarbon vapors from a cracking or distilling unit (not shown) are introduced into the fractionating tower 10, which may be a bubble tower, and are therein subjected to fractionation to condense heavier constituents boiling above the furnace oil range. The heavier condensed constituents are withdrawn from the bottom of the bubble tower 10 through line 17 and may be returned to the cracking zone for further treatment.

The temperature at the top of the fractionating tower may be controlled to take overhead a combined fraction of gasoline and furnace oil, in which case the mixed vapors are withdrawn through line 15 and passed through a partial condenser 16 wherein a fraction consisting principally of furnace oil constituents is condensed. Alternatively, the furnace oil fraction may be separately condensed in the upper section of the bubble tower 10 and collected in a trap-out tray 19, from which it is withdrawn through a line 21 and merged with the uncondensed gasoline vapors withdrawn through line 15. The mixture of gasoline vapor and liquid furnace oil then passes through line 18, forming a continuation of line 15, to a clay tower I adapted to contain a bed of solid adsorbent material, such as fuller's earth, various types of clays, or the like. The clay tower I is of conventional design containing a perforated tray 22 located at an intermediate section of the tower and adapted to support a bed of adsorbent material 23. A space is provided in the bottom of the clay tower for separation of the treated products into vapors and liquids.

The combined stream of gasoline vapor and liquid furnace oil passes downwardly through the bed of adsorbent material and is subjected to treatment thereby. Treated vapors are withdrawn from the bottom portion of the clay-treating tower I through line 24 and are passed to a second clay-treating tower II wherein adsorbent treatment for removing unstable constituents is completed.

Liquid products resulting from the initial treatment, including the unvaporized furnace oil component of the original charge, together with liquid polymers formed as a result of the treatment are withdrawn from the bottom of clay-treating tower I through line 25 and may be withdrawn from the system through line 26 or subjected to further treatment as hereinafter described.

Liquid polymers resulting from the treatment in clay tower II collect in the bottom thereof and are withdrawn through line 27. The treated vapors from clay tower II pass through line 28 to the fractionating tower II wherein they are subjected to fractionation. A portion or all of the liquid polymers separated in the clay tower II, and withdrawn from the bottom thereof through line 27, may be introduced into the fractionating tower II above the point of entry of the vapors and used as a reflux therefor, or a portion or all of these liquid polymers may be passed through line 29 and combined with liquid products from the first clay-treating tower for further treatment therewith. The vapors passing through the fractionating tower II are subjected to fractionation to condense higher-boiling constituents therefrom. The top temperature of this tower is regulated by the introduction of suitable reflux or by indirect cooling or by both to take overhead a vapor product within the desired boiling range. Vapors remaining uncondensed in the tower II pass overhead through line 31 and condenser 32, wherein the gasoline constituents thereof are condensed, to a receiving tank 13 wherein the gasoline distillate collects. The receiving tank 13 is provided with a vent pipe 33 for removing uncondensed gases. The vent pipe is provided with a valve 34 for maintaining the desired back pressure on the apparatus. Distillate is withdrawn from tank 13 through line 35.

Liquid products collected in the bottom of the fractionating tower II are withdrawn through line 36 and may be withdrawn from the system through line 37, or a portion or all of the products may be passed through line 38 and merged with liquid products withdrawn from the bottom of clay-treating tower I, or a portion or all may pass via lines 36, 38 and 39 into the top of clay tower I to serve as a solvent or fluxing agent for polymers formed therein, line 39 being provided with a pump 94.

The liquid furnace oil component of the original charge treated in clay tower I together with liquid polymers formed therein with or without being combined with a portion or all of the liquid polymers from further treatment of the vapors, may be withdrawn as a final furnace oil product through lines 25 and 26, as hereinbefore described, or the combined products may be subjected to distillation to remove gasoline constituents present therein or to remove polymers formed in the treatment, or both.

To this end the liquid may be passed through lines 25 and 41 to the combined distilling and fractionating tower 12 and subjected to distillation either by pressure reduction through reducing valve 42 or by supplying additional heat by means of a heating coil 43 located in the bottom of the distilling tower or by both pressure reduction and additional heat. In lieu of heating coil 43 the combined stream of furnace oil and polymers may be passed through a separately fired coil (not shown) before being discharged into the tower 12.

The distilling and fractionating tower 12 may be controlled with respect to temperature and pressure to separate only the gasoline constituents present, in which event the gasoline vapors after fractionation will pass through line 44 to condenser 45, or the temperature and pressure conditions may be controlled to vaporize both the furnace oil component and gasoline constituents present. In the latter case the upper section of fractionating tower 12 will be controlled to condense the furnace oil component and pass overhead the gasoline constituents as vapors. Furnace oil condensate formed in the upper section of tower 12 is separately collected in trap-out tray 46 and withdrawn therefrom through line 47 which leads to storage. Unvaporized polymers are withdrawn from the system through line 48.

Gasoline distillate condensed in condenser 45 passes to receiving drum 14 from which it is withdrawn through line 49. The drum 14 is further provided with a vent pipe 51 for removing uncondensed gases.

The following example of operating conditions will serve as a guide in carrying out the invention to obtain the greatest benefits therefrom, it being understood that the specific conditions herein given are illustrative rather than limitative.

The combined charge including the vapor and liquid components passed to clay tower I may have an end point of from 500 to 600° F., preferably from about 550° to about 570° F. The liquid component, herein referred to as the furnace oil component, may have an initial boiling point of from 350° to 500° F. and preferably from 425° F. to 450° F. While I have referred to the liquid component as furnace oil, it is unnecessary to effect a sharp separation of furnace oil and gasoline at this stage of the treatment since the final separation of the gasoline and furnace oil may be accomplished in the after-fractionating towers 11 and 12. The liquid component may therefore include heavier constituents of the gasoline, or the vapor fraction may include the lighter constituents of the furnace oil. The liquid component being treated serves to wash the clay bed of polymers formed during the treatment.

The temperature in clay tower I may range from 350° F. to about 600° F., depending on pressure maintained. The temperature and pressure maintained will depend upon the extent of treatment required, it being understood that temperature and pressure relationship will be controlled to maintain a substantial portion of the products being treated in liquid phase while the major portion of the gasoline is in vapor phase. The temperature in clay tower II may be substantially the same as that in clay tower I, or a higher or lower temperature may prevail, depending on the extent of treatment desired.

The pressure in the two clay towers and the fractionating tower 11 may be substantially uniform except for the required drop to maintain the desired flow, or a differential pressure between the fractionating tower and the clay towers or between the two clay-treating towers may be maintained. This pressure may range from substantially atmospheric to from 400 to 500 pounds per square inch, for example. The pressure in the combined distilling and fractionating tower 12 may be substantially that maintained in clay tower I but is preferably somewhat lower such as from sub-atmospheric to about 50 pounds per square inch. The temperature in the bottom section of this tower may range from 400° F. to 600° F., depending on the amount of vaporization desired.

Partially spent material employed in subjecting the gasoline vapors to the final treatment in clay tower II may be transferred to clay tower I and employed in the treating of the combined furnace oil, and gasoline constituents; or the partially spent material from clay tower I employed in treating the combined furnace oil and gasoline constituents may be transferred to clay tower II for effecting the final treatment of the gasoline constituents or; if desired, suitable manifolding may be provided between the towers so that the initial charge may be passed to either of the towers as desired.

Figure 2 represents an apparatus for carrying out a further embodiment of my invention. Referring to this figure, cracked hydrocarbon vapors, preferably from a high-temperature vapor phase cracking operation are introduced into a fractionating tower 60 and subjected to fractionation to condense higher-boiling constituents thereof. Condensate formed in the lower section of the fractionating tower collects in the bottom of the tower from which it is withdrawn through line 61 and may be returned to the cracking unit for further treatment.

In accordance with this embodiment the temperature and pressure conditions within the fractionating tower 60 are preferably regulated either to condense constituents boiling above the normal end point of gasoline in which event the total gasoline fraction will pass overhead through line 62, or a higher-boiling gasoline fraction may be condensed in the upper section of the tower, in which case a low end point gasoline or light naphtha fraction is passed overhead through line 62. In the latter case a trap-out tray 63 is provided for separately collecting the higher-boiling gasoline or heavy naphtha fraction, and this fraction is removed from trap-out tray 63 through line 64 and combined with the light naphtha vapor fraction withdrawn through line 62.

When withdrawing the total gasoline fraction from the tower 60 in the form of vapors, as in the first instance, the total fraction is subjected to partial condensation either by increasing the pressure on the vapors by means of compressor pump 65 or by partially cooling the vapors by means of a condenser coil 66 or by both to liquefy a heavy naphtha fraction. By effecting partial condensation of the gasoline vapors, either in the top of the tower or externally as above described, at a relatively high pressure, such as from 200 to 400 pounds per square inch, for example, a higher temperature may be maintained in the clay-treating equipment without causing vaporization of the heavy naphtha fraction.

The combined liquid and vapor fraction from fractionating tower 60 is passed into the top of clay-treating tower 67 in which it is subjected to treatment with adsorbent material to remove color-imparting and gum-forming constituents therefrom. As shown, this clay tower is provided with two beds 68 and 69 of solid adsorbent material such as clay arranged in vertically spaced relation to provide an intermediate vapor-separating space 70 between the two beds.

The clay tower is preferably constructed so that fresh adsorbent material may be charged to the top of the tower and spent or degraded material withdrawn from the bottom. To this end the top of the clay tower is provided with a hopper 71 for containing the solid adsorbent material and from which it may be discharged periodically through line 72, provided with valve 73 into the top of the clay tower. The supporting tray 74 for the upper bed 68 is preferably sloped toward a central discharge nozzle 75 provided with a sliding valve 76 which may extend through the tower shell so as to enable the valve to be operated without interrupting the treating process.

The supporting tray 77 for the lower bed 69 is also preferably sloped downwardly to a discharge conduit 78 projecting through the tower shell and provided with valve 79.

When it is desired to renew or replenish the adsorbent material the valve 79 in discharge conduit 78 is opened and a part or all of the spent material in the lower bed is removed from the apparatus and may be discarded or subjected to reactivation treatment. The valve 76 in discharge nozzle 75 in the upper supporting tray 74 is then opened, and a portion or all the adsorbent material for the upper bed is discharged into the lower bed and fresh material dropped into the upper bed through inlet pipe 72 to replace partially spent material withdrawn therefrom. From the above it will be evident that partially spent material from the upper bed will be charged to the lower bed and that the removal of degraded material and the replacement thereof with fresh material can be readily accomplished without interrupting the process.

The combined liquid and vapor fractions pass downwardly through the upper bed and are subjected to treatment therein to improve the vapor fraction to the desired extent. After passing through the upper bed of material the vapor and liquid fractions are allowed to separate in the intermediate separating zone 70 from which the vapors are removed through line 80 and may pass directly to condenser 81 wherein the desired low-boiling naphtha fraction condenses, or the vapors may be passed to a fractionating tower 82 for condensing higher-boiling constituents thereof before passing to the condenser 81.

Distillate from condenser 81 passes to a receiving drum 83 for collection. Receiving drum 83 is provided with a vent pipe 84 for removing uncondensed gases. Distillate is withdrawn through line 85.

The higher-boiling liquid fraction and polymers formed during the initial treatment, which are separated from vapors in the intermediate separating zone 70, continue downwardly through the lower bed 69 and are subjected to further treatment thereby after which they discharge through line 86 to a distilling and fractionating tower 87 wherein they undergo distillation and fractionation to remove higher-boiling polymers therefrom. A liquid level control valve 88 is provided in line 86 to maintain the desired level of liquid in the lower bed. The level maintained is usually such as to keep the lower bed completely submerged.

The liquid fraction upon being introduced into the distilling and fractionating tower 87 is heated to a distilling temperature such as by an indirect heating coil 90 located in the bottom of the tower to vaporize and separate the heavy naphtha fraction as vapors from the heavier polymers formed from the treatment. The heavy naphtha vapors pass overhead from tower 87 to a condenser 89 and the liquid polymers and higher-boiling condensate are withdrawn from the bottom of the tower through line 91.

The desired heavy naphtha distillate liquefied in condenser 89 passes to a receiving drum 92 for collection from whence it is withdrawn through line 93 and may be separately removed from the process or combined with the light naphtha fraction in line 85 to form a balanced gasoline.

The process described in connection with Figure II finds particular advantage whenever it is desired to subject the heavier fraction of the charging stock to more extended treatment than the lighter fraction, for example, in treating gasoline resulting from a high temperature, low pressure vapor-phase cracking operation.

In the operation described with reference to Figure II the temperature maintained in the upper zone of the clay-treating tower should be below the critical temperature of the liquid phase or in other words below the temperature at which the heavy naphtha fraction cannot exist as liquid. For normal gasolines this temperature should not exceed 550° F. Within this limit the temperature employed will depend upon severity of treatment. The pressure maintained in the tower will be adequate to maintain a heavier fraction in liquid phase under the prevailing temperature conditions.

The terms "clay" and "adsorbent material" as employed herein are intended to include solid selective polymerizing agents effective to promote polymerization of undesirable color-imparting and gum-forming constituents to compounds having higher boiling points. Such materials may comprise fuller's earth and various types of clays, either natural or acid treated.

Having described the preferred embodiment of my invention, it will be understood that it embraces such other variations and modifications as come within the sphere and scope thereof and that it is not my intention to unnecessarily limit the invention or dedicate any novel features thereof.

I claim:

1. The method of treating a mixture of hydrocarbon vapors having an end boiling point between about 500° F. and about 600° F. and consisting of a gasoline fraction and a furnace oil fraction requiring different degrees of treatment to remove therefrom undesired color-imparting and gum-forming constituents which comprises partially condensing said vapors to form a liquid fraction consisting principally of furnace oil constituents, passing a mixture of said liquid fraction and uncondensed vapors through an initial treating zone, contacting said mixture in said zone with a solid adsorbent material to effect substantially complete removal of undesired color-imparting and gum-forming constituents from the furnace oil portion of said mixture and a partial removal of said undesired constituents from the gasoline portion of said mixture, separating from said mixture a higher boiling fraction consisting principally of furnace oil and withdrawing it from the process as a final product, subjecting the uncondensed vapors from said mixture to further treatment in a secondary treating zone by contact with solid adsorbent material for the removal of said undesired constituents by polymerization into higher boiling products, and introducing said higher boiling polymer products from said last-mentioned treatment into the top of said initial treating zone.

2. The method of treating a relatively low-boiling hydrocarbon fraction and a relatively high-boiling hydrocarbon fraction when each fraction requires a different degree of treatment to effect removal of color-imparting and gum-forming constituents undesired therein, which comprises passing a mixture of the said fractions through a stationary treating bed consisting of consolidated finely divided solid adsorbent catalytic material with said low-boiling fraction in the vapor phase and with said high-boiling fraction in the liquid phase to effect substantially complete polymerization and removal of undesired constituents from one of said fractions and partial removal of undesired constituents from the other of said fractions, separating from the mixture and withdrawing as a final product the one of said fractions from which undesired constituents have been removed substantially entirely, and passing the remaining fraction through a second stationary treating bed consisting of consolidated finely divided solid adsorbent catalytic material for further treatment to effect substantial polymerization and removal therefrom of remaining undesired constituents.

3. The method of treating a relatively low-boiling hydrocarbon fraction in the gasoline boiling range and a relatively high-boiling hydrocarbon fraction in the furnace oil boiling range when said high-boiling fraction requires a lesser degree of treatment than said low-boiling fraction to effect substantial removal of color-imparting and gum-forming constituents undesired therein, which comprises passing a mixture of the said fractions through a stationary treating bed consisting of consolidated finely divided solid adsorbent catalytic material with said low-boiling fraction in the vapor phase and with said high-boiling fraction in the liquid phase to effect substantially complete polymerization and removal of undesired constituents from the said high-boiling liquid phase fraction and partial removal of undesired constituents from the said low-boiling vapor phase fraction, separating from the said mixture the said high-boiling furnace oil fraction and withdrawing it from the process as a final product, and passing the remaining low-boiling gasoline fraction through a second stationary treating bed consisting of consolidated finely divided solid adsorbent catalytic material for further treatment to effect substantial polymerization and removal therefrom of remaining undesired constituents.

4. The method of treating a mixture of hydrocarbon vapors having an end boiling point between about 500° F. and about 600° F. and consisting of a gasoline fraction and a furnace oil fraction when the furnace oil fraction requires a lesser degree of treatment than said gasoline fraction to remove therefrom color-imparting and gum-forming constituents undesired therein, which comprises partially condensing said vapors to form a liquid fraction consisting principally of furnace oil constituents, passing the mixture of said liquid fraction and uncondensed vapors through a stationary treating bed consisting of consolidated finely divided solid adsorbent catalytic material to effect substantially complete polymerization and removal of undesired constituents from the liquid phase furnace oil fraction and partial removal of undesired constituents from the vapor phase fraction, separating from the thus treated mixture the furnace oil fraction and withdrawing it from the process as a final product, and passing the remaining gasoline fraction through a second stationary treating bed consisting of consolidated finely divided solid adsorbent catalytic material for further treatment to effect substantial polymerization and removal therefrom of remaining undesired constituents.

5. The method of treating a relatively low-boiling hydrocarbon fraction and a relatively high-boiling hydrocarbon fraction when each fraction requires a different degree of treatment to effect removal of color-imparting and gum-forming constituents undesired therein, which comprises passing a mixture of the said fractions through a stationary treating bed consisting of consolidated finely divided solid adsorbent catalytic material with said low-boiling fraction in the vapor phase and with said high-boiling fraction in the liquid phase to effect substantially complete polymerization and removal of undesired constituents from said low-boiling fraction and partial removal of undesired constituents from said high-boiling fraction, separating from the mixture and withdrawing as a final product the said low-boiling fraction from which undesired constituents have been removed substantially entirely, and passing the remaining high-boiling fraction through a second stationary treating bed consisting of consolidated finely divided solid adsorbent catalytic material for further treatment to effect substantial polymerization and removal therefrom of remaining undesired constituents.

6. The method of treating a mixture of hydrocarbon vapors consisting principally of gasoline constituents including a higher-boiling fraction and a lower-boiling fraction when said lower-boiling fraction requires a lesser degree of treatment than said higher-boiling fraction to effect substantial removal of color-imparting and gum-forming constituents undesired therein which comprises partially condensing said vapors to form a higher-boiling liquid fraction and a lower-boiling vapor fraction, passing the mixture of said liquid fraction and said vapor fraction through a stationary treating bed consisting of consolidated finely divided solid adsorbent catalytic material to effect substantially complete polymerization and removal of undesired constituents from the lower-boiling vapor fraction and partial removal of undesired constituents from the said higher-boiling liquid fraction, separating from the thus treated mixture the lower-boiling vapor fraction and withdrawing it from the process, and passing the remaining higher-boiling fraction through a second stationary treating bed consisting of consolidated finely divided solid adsorbent catalytic material for further treatment to effect substantial polymerization and removal therefrom of remaining undesired constituents.

HORACE B. COOKE.